(12) United States Patent
Ruiz

(10) Patent No.: US 6,357,561 B2
(45) Date of Patent: *Mar. 19, 2002

(54) THERMAL EXPANSION BUSHING IN A METAL MATRIX COMPOSITE ROTOR

(75) Inventor: Stephen J. Ruiz, Redondo Beach, CA (US)

(73) Assignee: Stop Technologies LLC, Torrance, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,889

(22) Filed: Oct. 15, 1999

(51) Int. Cl.$^7$ .............................................. F16D 65/10
(52) U.S. Cl. ................................ 188/218 XL; 188/18 A
(58) Field of Search ........................ 188/218 XL, 18 A, 188/71.6, 73.1, 250 G, 206 R; 301/35.62; 403/408.1, 256, 257, 260, 359.1, 359.5

(56) References Cited

U.S. PATENT DOCUMENTS

| | | | |
|---|---|---|---|
| 2,153,397 A | 4/1939 | Sandler | |
| 2,299,192 A | 10/1942 | Tormyn | |
| 2,999,704 A | 9/1961 | Haller et al. | |
| 3,074,768 A | 1/1963 | Abel | |
| 3,515,417 A | 6/1970 | Bowman | |
| 4,213,660 A | 7/1980 | Yasui et al. | |
| 4,354,711 A | * 10/1982 | Main .......................... 403/166 | |
| 4,671,094 A | 6/1987 | Break | |
| 4,747,472 A | * 5/1988 | Rath et al. .................. 188/73.1 | |
| 4,865,172 A | 9/1989 | Sommer | |
| 5,059,042 A | 10/1991 | Grierson | |
| 5,062,503 A | 11/1991 | Black et al. | |
| 5,190,124 A | * 3/1993 | Haneda ................. 188/218 XL | |
| 5,319,851 A | 6/1994 | Ikezawa et al. | |
| 5,407,035 A | 4/1995 | Cole et al. | |
| 5,526,914 A | 6/1996 | Dwivedi et al. | |
| 5,730,258 A | 3/1998 | Evans | |
| 5,746,152 A | * 5/1998 | Huse .......................... 114/363 | |
| 5,836,699 A | 11/1998 | Back et al. | |
| 5,878,843 A | * 3/1999 | Saum ................... 188/218 XL | |
| 5,927,446 A | 7/1999 | Evans | |
| 5,964,325 A | 10/1999 | Davison et al. | |
| 6,116,386 A | * 9/2000 | Martin ................. 188/218 XL | |
| 6,158,609 A | * 12/2000 | Kaiser ........................ 220/480 | |

FOREIGN PATENT DOCUMENTS

EP  0127932 A1 * 4/1984 ........... 188/218 XL

* cited by examiner

*Primary Examiner*—Robert J. Oberleitner
*Assistant Examiner*—Mariano Sy
(74) *Attorney, Agent, or Firm*—Blakely Sokoloff Taylor & Zafman

(57) ABSTRACT

The present invention relates to a rotor assembly. The rotor assembly includes a rotor having rotor holes disposed about an axis. Bushings are disposed within the rotor holes in order to protect the rotor holes from compression impact deformation. Each bushing includes an internal slot that permits the rotor to radially expand and contract due to changes in the temperature of the rotor. A hub having pin holes that align with the rotor holes is held to the rotor by drive pins disposed within the pin holes and the bushings. A bolt is placed into the drive pin and tightened to fix the hub to the rotor in the axial and circumferential directions. Other features are disclosed.

20 Claims, 8 Drawing Sheets

THERMAL EXPANSION BUSHING IN A METAL MATRIX COMPOSITE ROTOR

BACKGROUND OF THE INVENTION

1. Field of the Invention

The invention relates to a bushing that permits a brake rotor secured by bolts to thermally expand while protecting the brake rotor from deformation by the compressive impact of the bolts acting on the rotor.

2. Background Information

Friction brakes are used in cars, trains, airplanes, elevators, and other machines. In order to slow or stop an automobile, a driver steps on a brake pedal. Through mechanical linkage, the movement of the brake pedal is transmitted to a pair of fixed brake pads, between which is a brake rotor that rotates as the axle of the automobile turns from power transmitted by an engine. The brake rotor is fixed to the hub of a vehicle axle by an array of drive pin/bolt combinations radially distributed about the axle. Each drive pin/bolt combination is placed through opposite ends of apertures in the brake rotor and the hub. The brake rotor and the hub are secured to one another by tightening each bolt into its counter part drive pin.

As the driver applies force to the brake pedal, that force is transmitted as friction to the moving brake rotor by the fixed brake pads so as to slow the vehicle down or bring it to rest through controlled slippage. The rotational energy absorbed by the controlled slippage is converted into heat, principally within the brake rotor. As the brake rotor heats up, the brake rotor expands radially away from the vehicle axle. In high speed applications such as a high performance race car, the thermal expansion of the brake rotor especially is acute. If a brake rotor used in a high speed/high temperature application is not permitted to expand radially, the brake rotor would cone or warp the outer area surrounding the bolts.

To prevent coning and warping of the brake rotor area, brake designers conventionally use radially extending slots to form the drive pin/bolt apertures in the brake rotor. The length of each slot permits the brake rotor to expand and contract radially with the change in temperature of the brake rotor. The width of each radially slot works to control the rotational and axial movement of the brake rotor relative to the bolts and the brake pads.

A larger problem with the heating of a brake rotor is fading. As the temperature of the brake rotor increases, the rotor reaches a temperature where materials performance is adversely affected. As the rotor reaches this temperature, the frictional force between the brake pads and the brake rotor decreases. This phenomenon is called fading. Minimizing or preventing fading drives brake designers to focus on design techniques that dissipate brake rotor heat.

One principle technique used in the industry to dissipate brake rotor heat is the careful selection of the brake rotor material. Brake rotors are conventionally constructed from a variety of materials, including steel, cast iron, various metal alloys and composite materials. In particular, brake rotor designers look for toughness, low density (low weight), low wear, and high coefficient of thermal conductivity in the material they select for the brake rotor. Generally, brake rotors are cast in iron. However, new materials have been developed that allow casting of rotors from an aluminum metal matrix composite (MMC) material such as 359 aluminum with twenty percent silicon carbide particulate reinforcement. See, for example, U.S. Pat. No. 5,407,035 and U.S. Pat. No. 5,526,914.

The problem with focusing on the criteria of toughness, low density, low wear, and high thermal conductivity for brake rotor material is that these criteria do not account for the radially compressive impact forces experienced by the slots in the brake rotor. Each time the brake pads are applied to the brake rotor, the drive pins are pressed into the circumferential width of the slots. The compressive force of each drive pin acting on its associated slot width works to circumferentially distort the soft, malleable aluminum MMC material forming each slot in high speed/temperature applications.

Since brakes primarily are applied as an automobile is traveling in one direction, the deformation of each slot width in one radial direction usually predominates over the deformation of each slot width in the opposite radial direction. As the width of each slot increases due to compression slot expansion, the brake rotor freely begins to move rotationally relative to the bolts and the brake pads. Now, the width of each radially slot does not work to control the rotational movement of the brake rotor relative to the bolts and the brake pads.

Without the rotor being rotationally fixed relative to the brake pads, the braking cycle is adversely affected. The rotational movement of the rotor causes judder and vibration, each of which works to lessen the radially slot control over the axial movement of the brake rotor relative to the brake pads. The lessening of the radially slot control over the axial movement of the brake rotor relative to the brake pads causes imbalance in the rotor. As the slots widen over time, the time it takes to brake over a given length and speed increases. Noise and judder eventually become so pronounced that the brake system becomes inoperable. Eventually, brake rotors degraded by compression slot expansion have to be replaced. Thus, there is a need to minimize or eliminate compression slot expansion.

SUMMARY OF THE INVENTION

The present invention relates to a rotor assembly. The rotor assembly includes a rotor having rotor holes disposed about an axis. Bushings are disposed within the rotor holes in order to protect the rotor holes from compression impact deformation. Each bushing includes an internal slot that permits the rotor to radially expand and contract due to changes in the temperature of the rotor. A hub having pin holes that align with the rotor holes is held to the rotor by drive pins disposed within the pin holes and the bushings. A bolt is placed into the drive pin and tightened to fix the hub to the rotor in the axial and circumferential directions. Other features are disclosed.

DETAILED DESCRIPTION OF THE INVENTION

Figure 1:
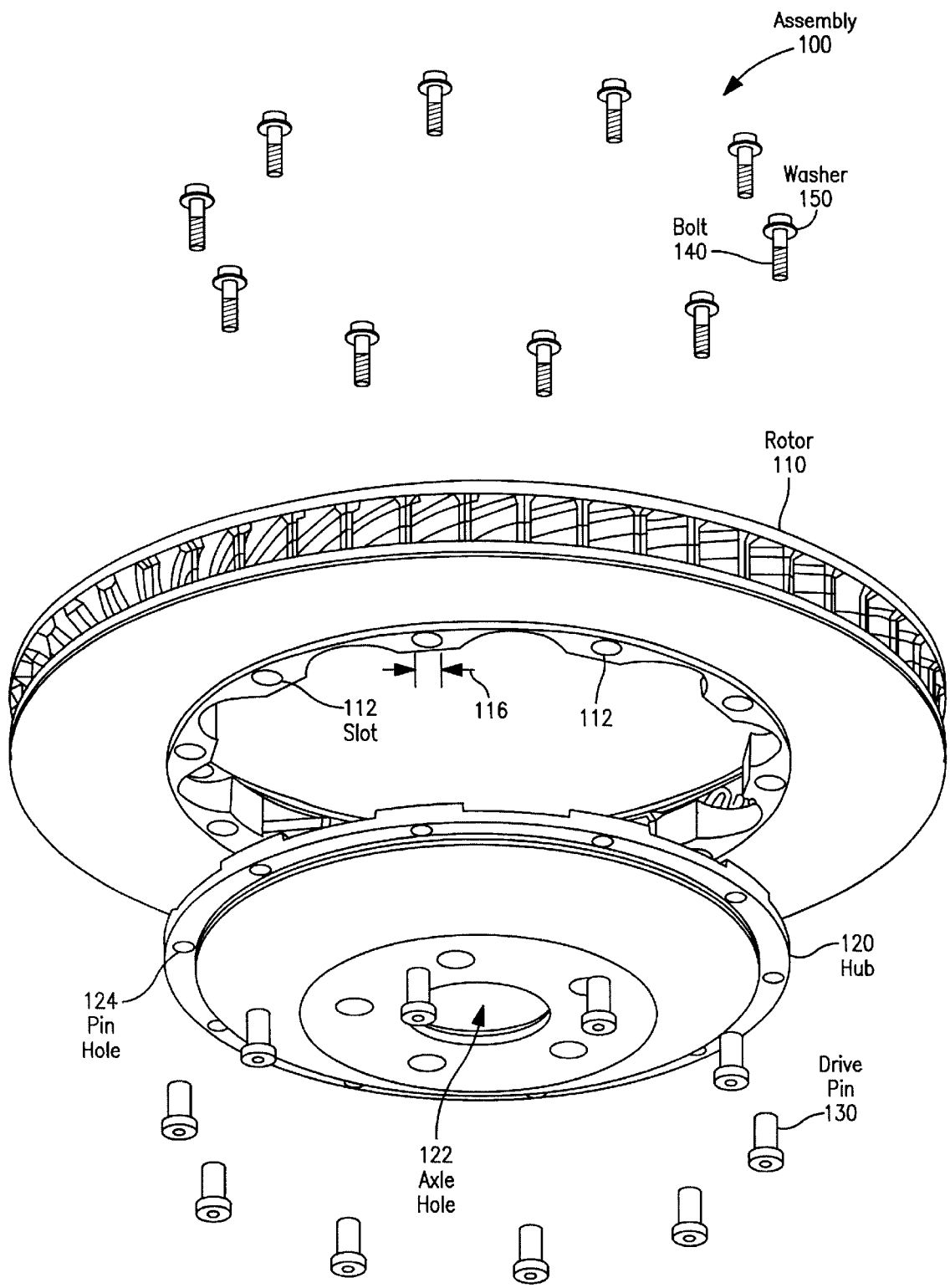
FIG. 1 is an exploded isometric view of conventional brake rotor assembly 100.

FIG. 1 is an exploded isometric view of conventional brake rotor assembly 100. Included with brake rotor assembly 100 may be rotor 110, hub 120, drive pins 130, bolts 140, and washers 150. As shown, rotor 110 is an annular ring having slots 112 disposed on the interior of the ring. Slots 112 are used to connect rotor 110 to hub 120 and yet allow for thermal expansion of rotor 110.

Hub 120 is an annular disc that includes axle hole 122 and pin hole 124. Axle hole 122 is where an axle of an automobile might extend into so as to maintain rotor 110 adjacent to the brake pads and tire of the automobile. Drive pins 130 have a threaded interior and are extended through pin holes 124 and slots 112 so as to bring hub 120 in contact with rotor 110. Washers 150 are inserted around bolts 140 and bolts 140 are threaded into drive pin 130. Tightening bolts 140 into drive pins 130 fixes hub 120 to rotor 110 in the rotational and axial directions, but frees rotor 110 to expand in the radial direction.

Figure 2:
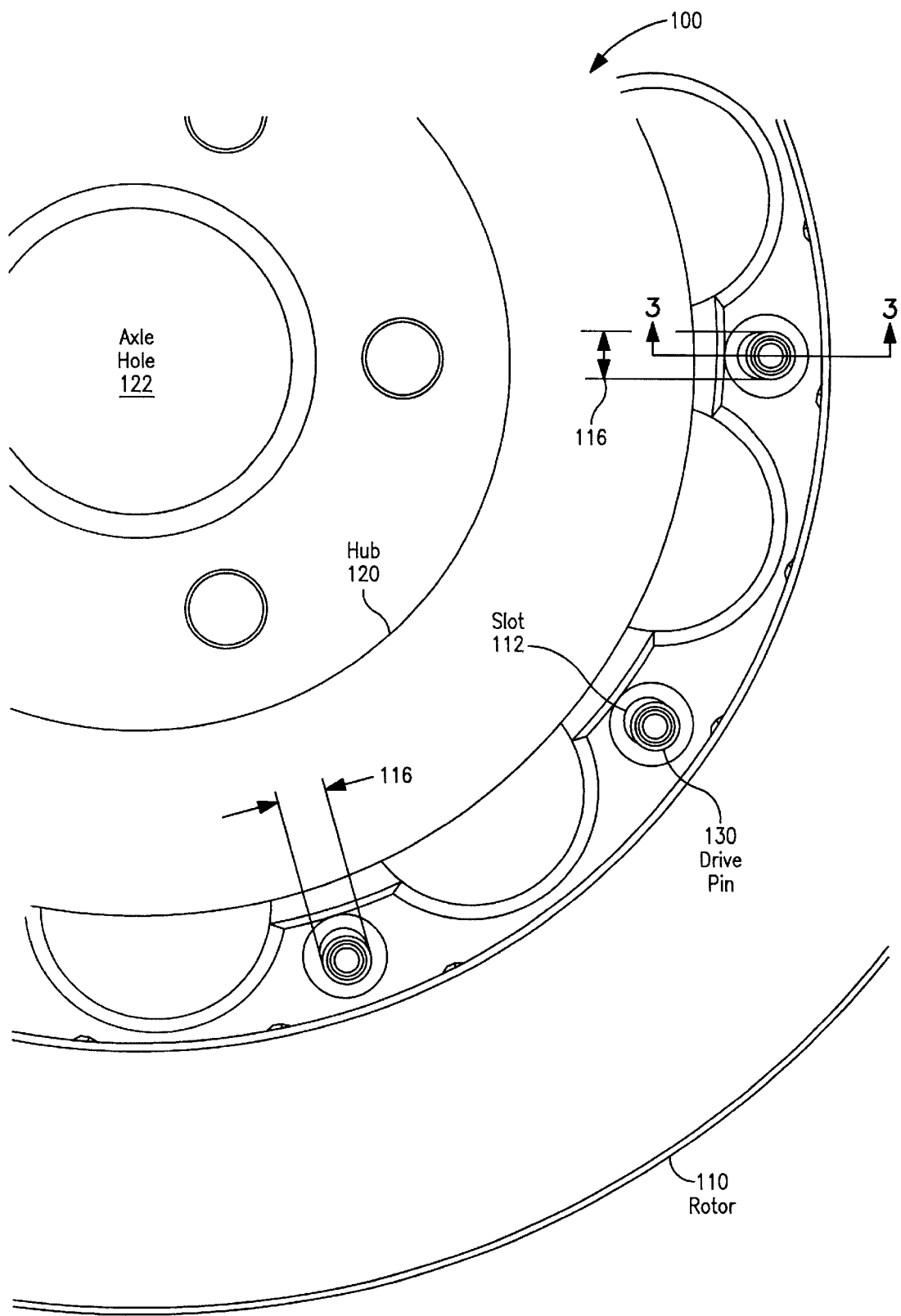
FIG. 2 is a plan view of FIG. 1 looking down on brake rotor assembly 100 without bolts 140.

FIG. 2 is a plan view of FIG. 1 looking down on brake rotor assembly 100 without blots 140. As can be seen in FIG. 2, drive pin 130 resides within slot 112 at the furthest radially location within slot 112 during initial assembly. This makes sense since as rotor 110 radially expands die to heat, slots 112 move away from axle hole 122 and radially around drive pins 130.

Figure 3:
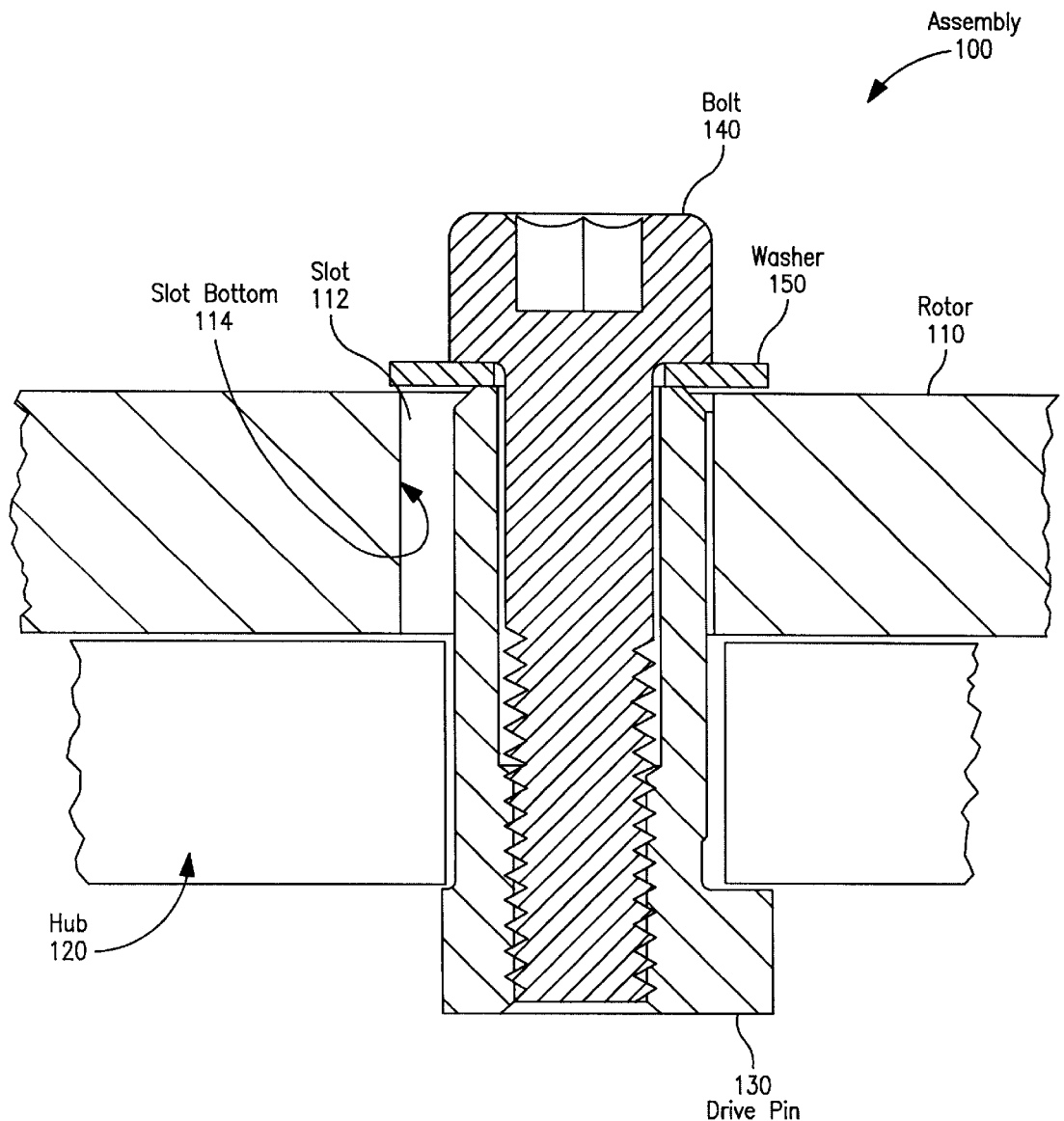
FIG. 3 is a cross sectional view of assembly 100 taken generally off of line 3—3 of FIG. 2.

FIG. 3 is a cross sectional view of assembly 100 taken generally off of line 3—3 of FIG. 2. As can be seen, drive pin 130 resides within slot 112 at the furthest radially location within slot 112, here the furthest point to the right of slot 112 in FIG. 2. This leaves a gap between drive pin 130 and slot bottom 114 by which rotor 110 may radially expand with little resistance from drive pin 130.

Although rotor 110 may radially expand with little resistance from drive pin 130, drive pins 130 prevent rotor 110 from moving in the circumferential direction. Thus, as can best be understood by viewing FIG. 2, each time rotor 110 is slowed, drive pins 130 pressed into one side of circumferential width 116 of slots 112. The compressive force of each drive pin 130 acting on its associated circumferential slot width 116 works to circumferentially distort the soft, malleable material forming each slot 112, especially in high speed/temperature applications. In one embodiment, the invention overcomes this through the use of a bushing such as illustrated in FIG. 4 and FIGS. 5A, 5B, and 5C.

Figure 4:
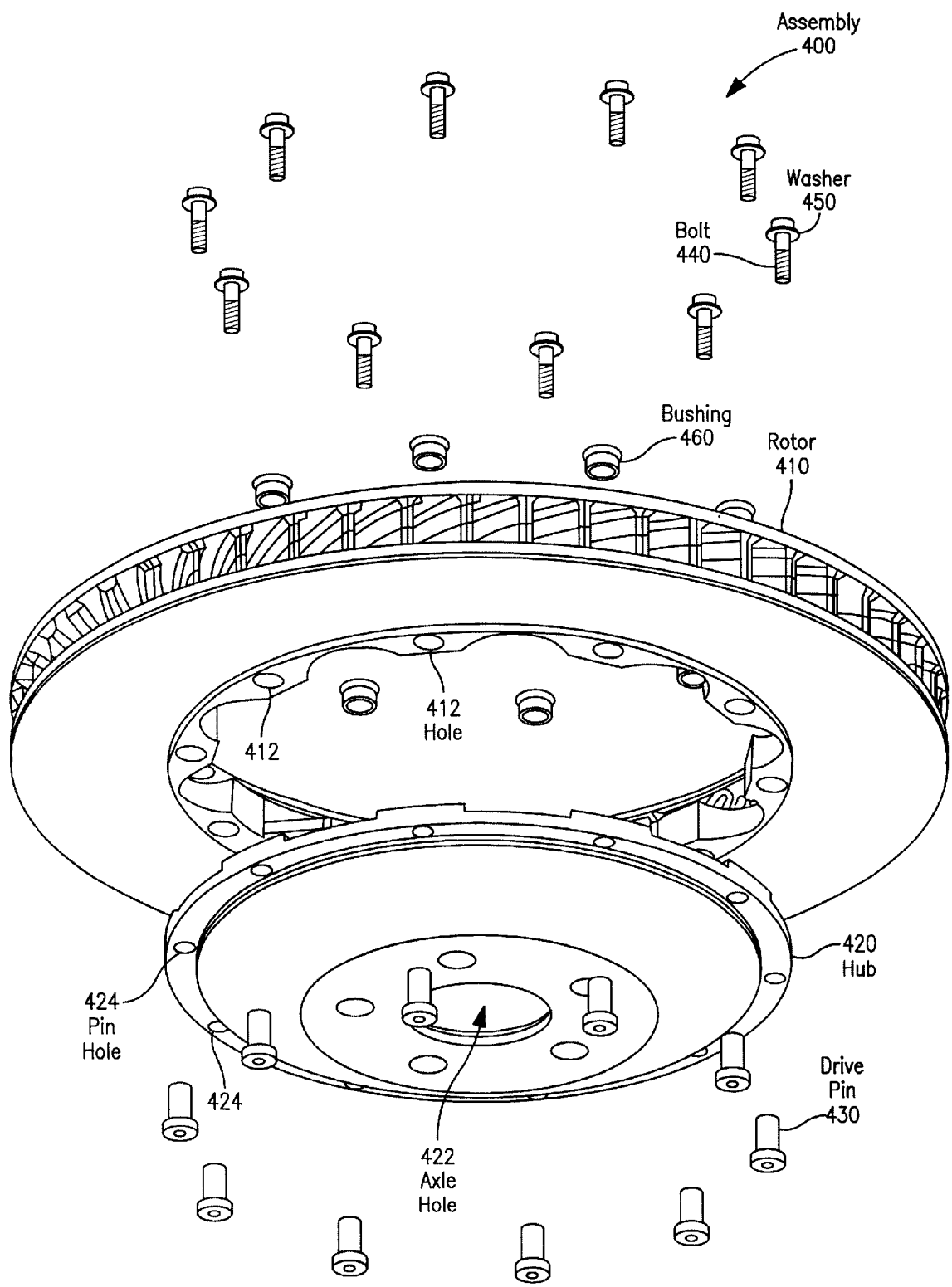
FIG. 4 is an exploded isometric view of rotor assembly 400.

FIG. 4 is an exploded isometric view of rotor assembly 400. Included with rotor assembly 400 may be rotor 410, hub 420, drive pins 430, bolts 440, washers 450, and bushings 460. Rotor 410 may be based on an automobile brake rotor. However, rotor 410 is not limited to automobile brake rotors. Rotor 410 may be any annular disc or ring that (i) revolves with respect to a stationary part, (ii) heats up as the annular disc slows down with respect to the stationary part, and (iii) radially expands as the annular disc heats up. Although rotor 410 need not be used in brakes, one way rotor 410 may heat up includes controlled slippage such as experienced by brake pads applying friction to the sides of rotor 410.

Preferably, rotor 410 includes holes 412. Holes 412 represent material removed from rotor 410 and are used to connect rotor 410 to hub 420. Since round holes are the easiest to machine in an aluminum metal matrix composite (MMC) material, preferably holes 412 have a constant diameter. However, the interior profile of holes 412 is not limited to round holes. The interior profile of holes 412 may be any shape that is complementary to the exterior profile of bushing 460, including holes in the shape of slots. Furthermore, the interior profile of holes 412 may be complementary to the exterior profile of bushing 460 so as to retain bushing 460 and also permit radial thermal expansion of rotor 410, even where bushings 460 themselves permit thermal expansion of rotor 410.

Hub 420 preferably is an annular disc that may include pin holes 424 and axle hole 422. Hub 420 may couple rotor 410 to a rotating piece (not shown) disposed within axle hole 422. For example, axle hole 422 is where an axle of an automobile might extend into so as to maintain rotor 410 adjacent to the stationary brake pads and rotating tire of an automobile.

Assembly 400 preferably includes a locking pin such as a drive pin/bolt combination. Drive pins 430 have an interior or exterior by which bolts 440 may be fixed. For example, drive pins 430 may have a threaded interior to fix exterior threads on bolt 440 or a threaded exterior to fix interior threaded bolt 440. Bolts 440 preferably are threaded bolts, but may be any device performing a key or lock function in connection with drive pin 430. Washers 450 include any flat, thin, continuous or discontinuous ring or perforated plate used in assemblies to ensure tightness or relieve friction. Bushings 460 are discussed in more detail in connection with FIGS. 5A, 5B, and 5C.

To bring together rotary assembly 400, bushings 460 are placed into holes 412 so that the long axis of slot 480 is aligned to a radial axis of rotor 410. Drive pins 430 are extended through pin holes 424 and bushings 460 so as to bring hub 420 in contact with rotor 410. With washers 450 preferably inserted around bolts 440, bolts 440 may be threaded into drive pin 430. As bolt 440 is tightened into drive pin 430, rotor 410 becomes fixed to hub 420 in the rotational and axial directions, where bushings 460 free rotor 410 to expand in the radial direction.

Figure 5B:
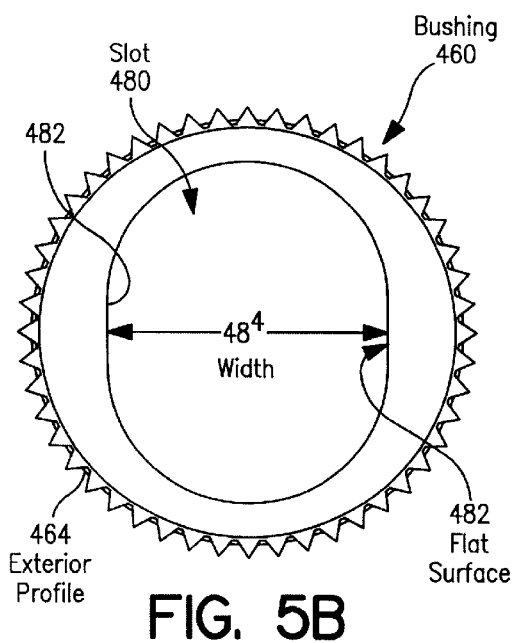
FIG. 5B is a top view of bushing 460.
Figure 5A:
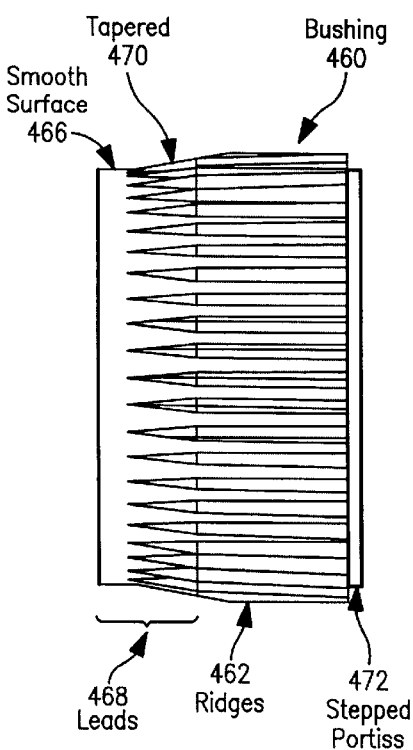
FIG. 5A illustrates a side view of busing 460.
Figure 5C:
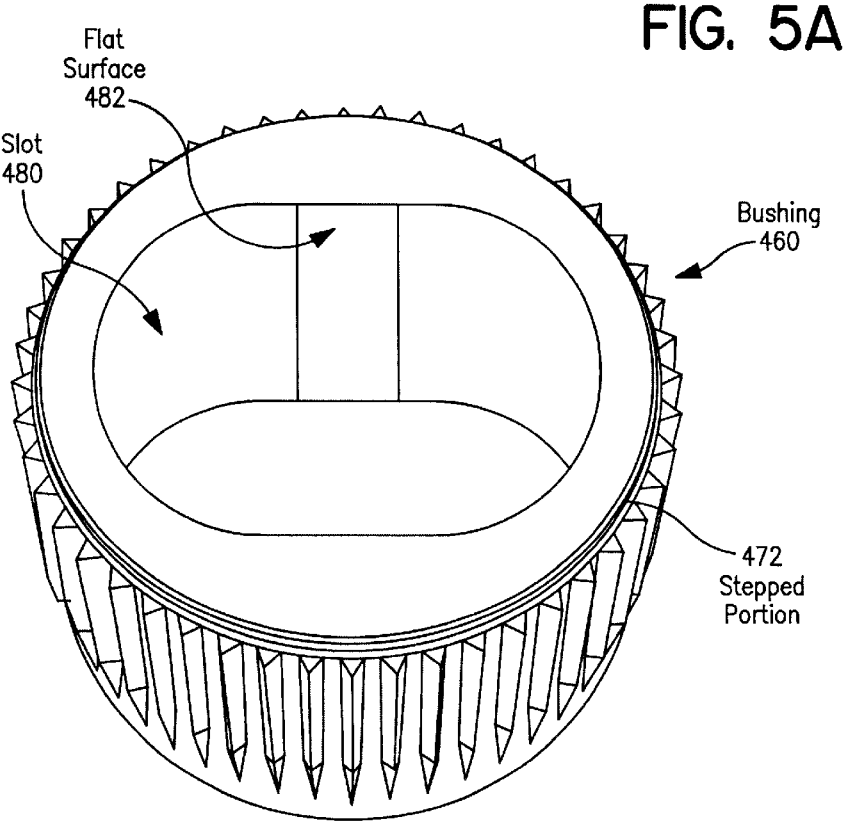
FIG. 5C is an isometric view of bushing 460.

FIG. 5A illustrates a side view of bushing 460. FIG. 5B is a top view of bushing 460 and FIG. 5C is an isometric view of bushing 460. Bushing 460 may be any lining between drive pin 430 (or bolt 440) and hole 412 that (i) protects holes 412 from compression impact, (ii) maintains the structural integrity of drive pin 430 (or bolt 440), (iii) works to retain rotor 410 from moving in the rotational and axial directions, and, (iv) in the radial direction, permits rotor 410 to expand on heating and contract on cooling. Bushing 460 may be part of rotor 410 or, preferably, a separate piece added to rotor 410 so that bushing 460 is removable from hole 412.

Retaining bushing within hole 412 may be achieved by any technique that lends itself to convenient assembly. For example, bushing may be pressed or shrunk fit within hole 412. Press fits are a function of interference fits whereas shrink fits may be accomplished by heating rotor 410 or by chilling bushing 460 in a mixture of dry-ice and alcohol, or in liquid air, prior to installing bushing 460 into rotor 410. However, since rotor 410 is expected to heat up during operations of rotor 410, interlocking extensions between hole 412 and bushing 460 are preferred so as to key rotor 410 and bushings 460 together.

To retain bushing 460 within hole 412, bushing 460 preferably include ridges 462 distributed around exterior profile 464 of bushing 460. Ridges 462 may be angular features that expand in a sixty degree angle as they extend radially inward approximately one millimeter towards the smooth surface 466 of bushing 460. So that bushing 460 lends itself to ease of assembly, ridges 462 preferably include leads 468 having tapered portion 470. In a preferred embodiment, tapered portions 470 blend into smooth surface 466 at a ten degree angle over the last three eighths of the length of ridges 462. Smooth surface 466 may have a lead-in feature itself.

If the material surrounding holes 412 is softer than the material of bushing 460, ridges 462 may extend slightly into the perimeter of hole 412 so as to key bushing 460 to rotor 410. Alternatively, bushing 460 may include other keying techniques such as employing one or more set screws, woodruff keys, bolted bearing flanges, exterior threads, dowel pins, and a housing cap. For a housing cap, each hole 412 comprises two separate half (one being a cap) that are brought together to form a hole.

Exterior profile 464 of bushing 460 preferably is round so as to permit a snug fit within hole 412. However exterior profile 464 may be any shape, including square, rectangular, oval, ellipse, and triangular as well as unsymmetrical shapes. The unsymmetrical shape may be ones that account for compressive impact and the need to secure bushing 460 to hole 412.

Bushing 460 may also include stepped portion 472 and slot 480. Stepped portion 472 permits washer 450 to extend from bushing 460 across stepped portion 472 to rotor 410 at a flat level. Slot 480 may be of similar profile as existing slot 112. Preferably, sides 482 of slot 480 that pass through a radius extending from the center of rotor 410 are flat. Sides or flat surfaces 482 face one another so as to form width 484 as seen in FIG. 5B. Since it is the fit between drive pin 430 and width 484 of bushing 460 that preferably retains rotor 410 from moving in the rotational and axial directions, it is important that width 484 be constant so that flat surfaces 482 are parallel to one another.

A preferred technique of countering the compressive impact force of drive pin 430 is to select a hard material for bushing 460. In order that bushing 460 protects holes 412 from compression impact and yet maintains the structural integrity of drive pin 430 (or bolt 440, which ever is external to the other), it is preferably that the hardness of the material for bushing 460 be between the hardness of the material forming holes 412 and the hardness for the material forming the connecting link such as drive pin 430. For example, where rotor 410 is made out of an aluminum metal matrix composite (MMC) material having a Rockwell hardness number of 73 to 77 on the Rockwell B scale and drive pins 430 are made out of a high carbon steel material having a Rockwell hardness number of 56 to 60 on the Rockwell C scale, preferably bushing 460 is made of a material having a Rockwell hardness number of approximately 36 to 50 on the Rockwell C scale (preferably Rockwell C-46). Note that the Rockwell C scale is for materials harder than Rockwell B-100. Bushing 460 preferably is made of a sintered metal material.

A non-preferred technique of countering the compressive impact force of a drive pin onto the holes in the rotor is to reduce the force per unit area experienced by slots 112 of FIG. 1. Where the force per unit area experienced by slots 112 of FIG. 1 is sufficiently reduced, bushing 460 may be omitted. The force per unit area experienced by slots 112 of FIG. 1 may be reduced by at least one of increasing the length of slot 112 in the axial direction, by increasing the diameter of drive pin 130 and the corresponding circumferential width of slot 112, and by angling slot 112 (so as to create more surface area). Since these techniques are not commercially practicable, they are non-preferred techniques.

Figure 6:
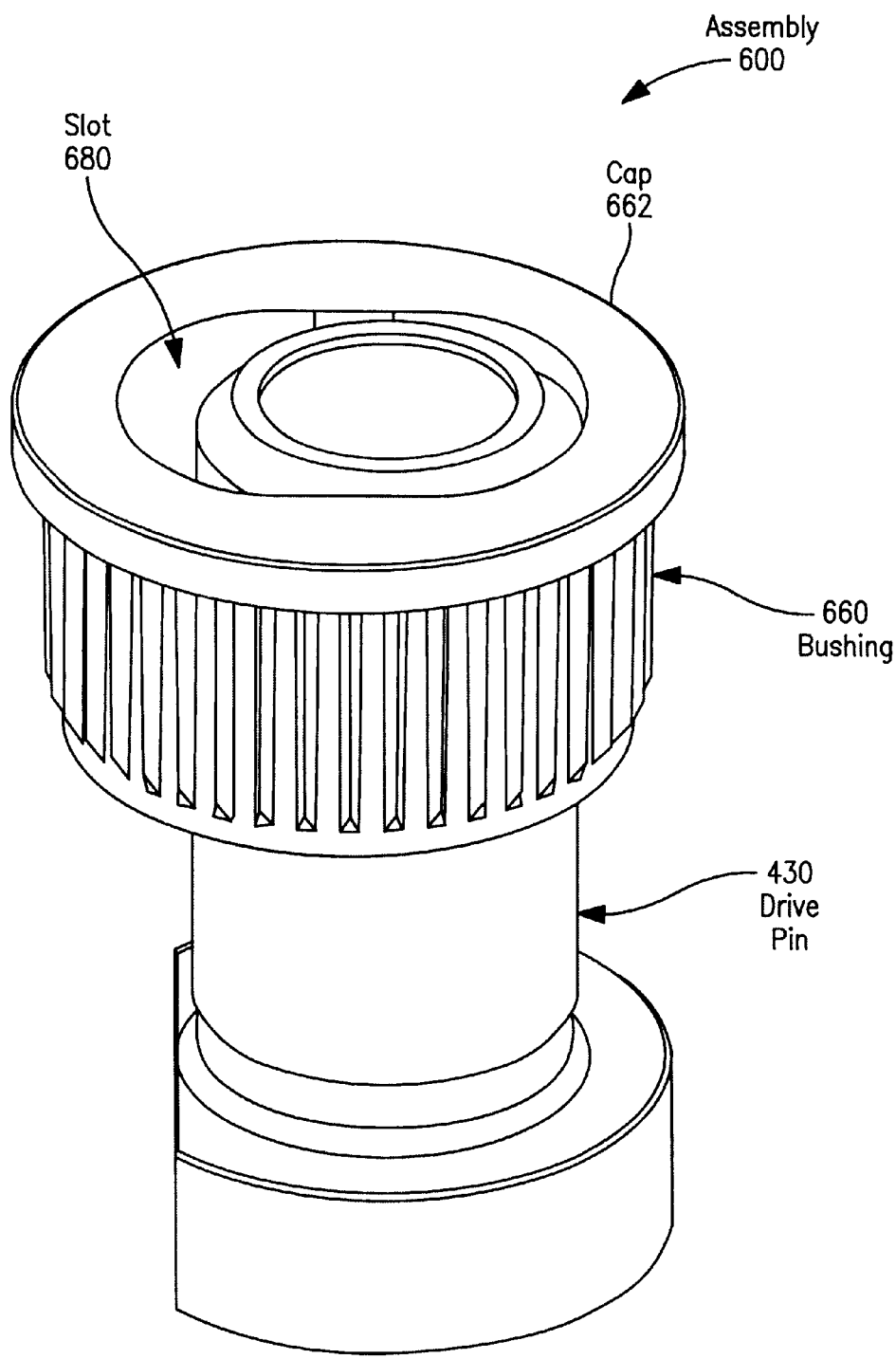
FIG. 6 illustrates bushing 660 brought about drive pin 430 as assembly 600 having rotor 410 and hub 420 removed for clarity.
Figure 7:
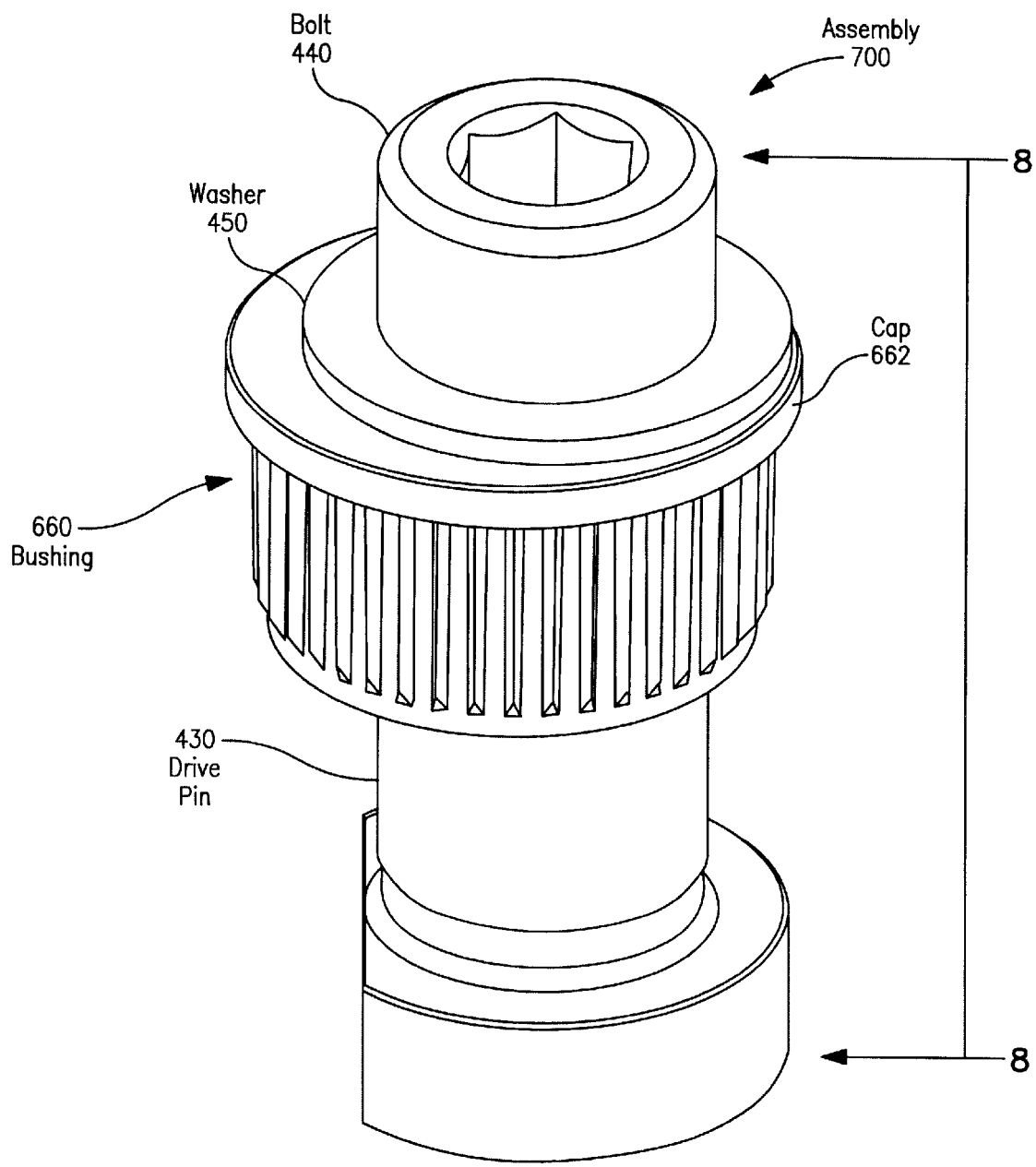
FIG. 7 illustrates bolt 440 brought into drive pin 430 as assembly 700. Note how washer 450 may reside flat on top of cap 662.

FIG. 6 illustrate s bushing 660 brought about drive pin 430 as assembly 600 having rotor 410 and hub 420 removed for clarity. Bushing 660 is similar to bushing 460 of FIG. 5C. However, bushing 660 of FIG. 6 further includes a cap 662 that takes the place of stepped portion 472 as best seen in FIG. 5A. Note how drive pin 430 may reside to one side of slot 680 so as to leave room for movement between drive pin 430 and bushing 660. FIG. 7 illustrates bolt 440 brought into drive pin 430 as assembly 700. Note how washer 450 may reside flat on top of cap 662.

Figure 8:
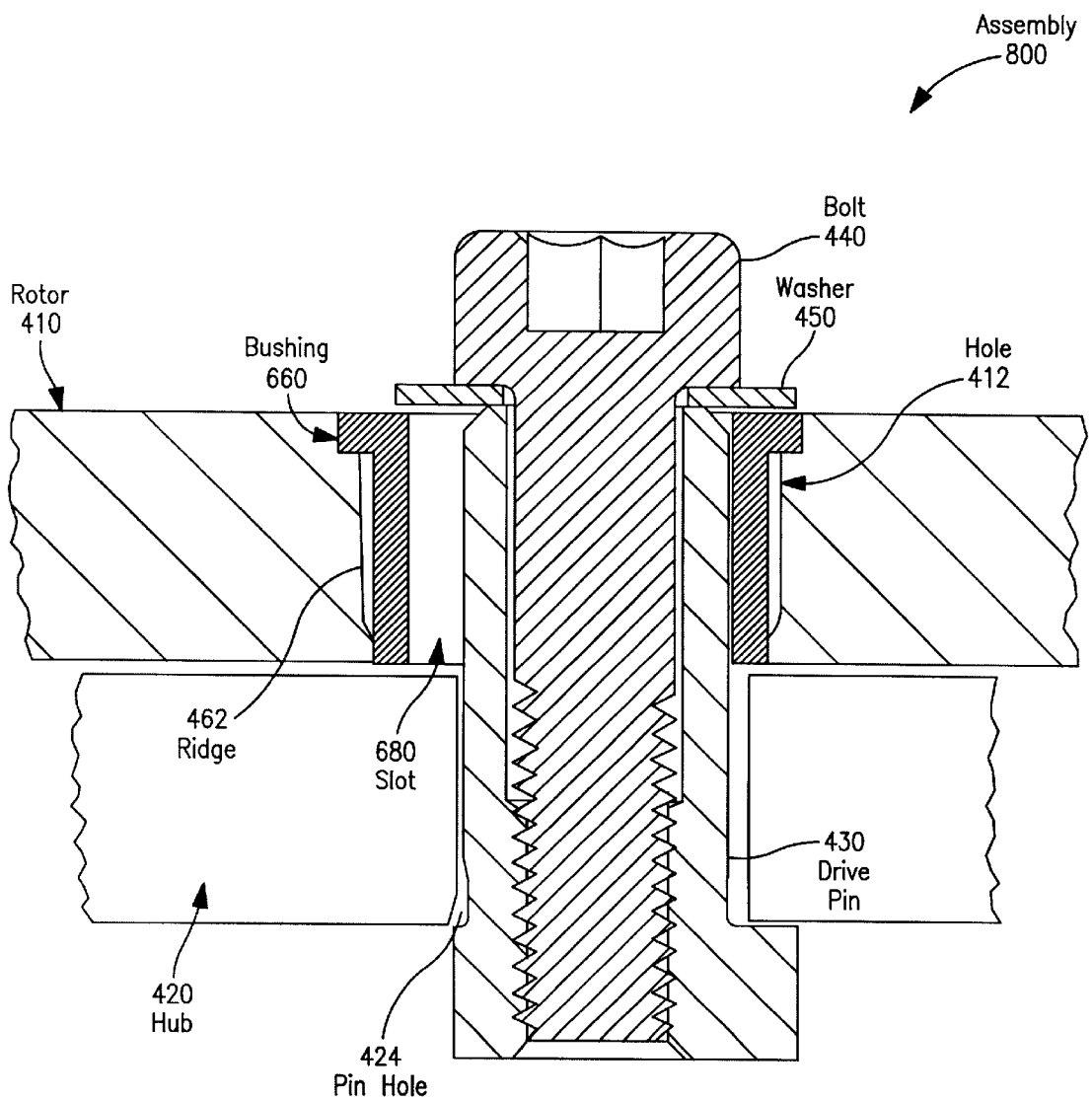
FIG. 8 is a section view of assembly 700 as taken off of lines 8—8 of FIG. 7.

FIG. 8 is a section view of assembly 700 as taken off of lines 8—8 of FIG. 7. To form assembly 800 of FIG. 8, bushing 660 is placed into hole so that ridges 462 wedge into the sides of hole 412 of rotor 410, with the material of rotor 410 tending to fill the spaces between ridges 462 so as to create a very secure fit. Drive pin 430 is placed through pin hole 424, the assembly of which is brought into contact with rotor 410 so that drive pin 430 extends through slot 680 of bushing 660. With washer 450 placed about the shaft of bolt 440, bolt 440 is tightened into the internal threads of drive pin 430 to a predetermined torque value so as to complete assembly 800.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. A rotor assembly, comprising:
   a rotor having a plurality of rotor holes disposed about an axis;
   a hub having a plurality of pin holes that align with the plurality of rotor holes, a central axle hole and a plurality of axle attachment holes, the plurality of pin holes for securing the hub to the rotor;
   a plurality of thermal expansion bushings disposed within the plurality of rotor holes, each thermal expansion bushing having an internal slot, the slot having length that extends radially away from the axis of the rotor and a width that is shorter than the slot length;
   a plurality of drive pins disposed within the plurality of pin holes and the plurality of thermal expansion bushings, one associated with each slot, each drive pin having a diameter that is not greater than an associated slot width; and
   a means for securing each drive pin to the hub and the rotor,
      wherein the plurality of thermal expansion bushings, the plurality of drive pins, and the means for securing each drive pin to the hub and the rotor are configured to permit the rotor to thermally expand in a high speed/temperature environment while protecting the rotor from deformation by compressive impact of the plurality of drive pins acting on the rotor.

2. The rotor assembly of claim 1, each of the plurality of rotor holes, the plurality of thermal expansion bushings, and the plurality of drive pins having a material having a hardness, wherein the hardness of the material forming the plurality of thermal expansion bushings is greater than the hardness of the material forming the plurality of rotor holes, and wherein the hardness of the material forming the plurality of thermal expansion bushings is less than the hardness of the material forming the plurality of drive pins.

3. The rotor assembly of claim 2, wherein the rotor is made out of an aluminum metal matrix composite (MMC) material, the plurality of drive pins are made out of a high carbon steel material, and the plurality of thermal expansion bushings are made out of a sintered metal material.

4. The rotor assembly of claim 2, where the hardness of the rotor is a Rockwell hardness number of 73 to 77 on the Rockwell B scale, the hardness of the plurality of drive pins is a Rockwell hardness number of 56 to 60 on the Rockwell C scale, and the hardness of the plurality of thermal expansion bushings is a Rockwell hardness number of approximately 36 to 50 on the Rockwell C scale.

5. The rotor assembly of claim 4, wherein the hardness of the plurality of thermal expansion bushings is a Rockwell hardness number of 46 on the Rockwell C scale.

6. The rotor assembly of claim 1, wherein the rotor is coupled to means for revolving the rotor with respect to a stationary part, wherein the rotor is coupled to means for slowing down the rotor with respect to the stationary part, and wherein the rotor is made of material that radially expands as the rotor slows down.

7. The rotor assembly of claim 6, wherein the rotor is an automobile brake rotor, wherein the means for revolving the rotor is an axle coupled to the rotor, wherein the means for slowing down the rotor is a brake pad, and wherein the rotor is made of an aluminum metal matrix composite material.

8. The rotor assembly of claim 1, each rotor hole having an interior profile that is complementary to the external profile of each of the plurality of thermal expansion bushings.

9. The rotor assembly of claim 8, the interior profile of each rotor hole having a constant diameter.

10. The rotor assembly of claim 1, wherein the width of each thermal expansion bushing defines two parallel surfaces.

11. The rotor assembly of claim 10, wherein each bushing is a piece that is separate from the rotor.

12. The rotor assembly of claim 1, wherein each thermal expansion bushing includes a means for keying that thermal expansion bushing to the rotor.

13. The rotor assembly of claim 12, wherein each thermal expansion bushing is defined by an exterior profile and the means for keying includes a plurality of ridges distributed about the exterior profile of each thermal expansion bushing.

14. The rotor assembly of claim 13, wherein each exterior profile is one of the following shapes: circular, square, rectangular, oval, elliptical, triangular, and unsymmetrical, wherein each bushing includes one of a stepped portion and a cap.

15. The rotor assembly of claim 12, wherein the means for keying includes at least one of a set screw, a woodruff key, a bolted bearing flange, exterior threads, a dowel pin, and a housing cap.

16. The rotor assembly of claim 1, wherein the means for securing each drive pin to the hub and the rotor include internal threads within each drive pin and a plurality of externally threaded bolts, each bolt disposed within the internal threads of each drive pin.

17. In a metal matrix composite rotor coupled to a hub having a plurality of pin holes, a central axle hole, and a plurality of axle attachment holes, the plurality of pin holes align with a plurality of rotor holes, the plurality of pin holes for securing the hub to the rotor, the rotor formed of material having a hardness, a thermal expansion bushing disposed in the rotor and disposed about a locking pin, the locking pin formed of material having a hardness, wherein the thermal expansion bushing and the locking pin are configured to permit the rotor to thermally expand in a high speed/temperature environment while protecting the rotor from deformation by compressive impact of the locking pin acting on the rotor, the bushing comprising:

an insert having material removed to form an interior slot, the material of the insert having a hardness wherein the hardness of the insert material is greater than the hardness of the rotor material, and wherein the hardness of the insert material is less than the hardness of the locking pin material.

18. The bushing of claim 17, wherein the locking pin includes a drive pin and a bolt.

19. The bushing of claim 18, where the hardness of the rotor is a Rockwell hardness number of 73 to 77 on the Rockwell B scale, the hardness of the drive pin is a Rockwell hardness number of 56 to 60 on the Rockwell C scale, and the hardness of the bushing is a Rockwell hardness number of approximately 36 to 50 on the Rockwell C scale.

20. The bushing of claim 19, wherein the hardness of the bushing is a Rockwell hardness number of 46 on the Rockwell C scale.

* * * * *